3,137,670
SILICONE ELASTOMERS HEAT-STABILIZED WITH HEAVY METAL OXIDES
Remo R. Maneri, Midland, Mich., assignor to Dow Corning Corporation, Midland, Mich., a corporation of Michigan
No Drawing. Filed Feb. 11, 1959, Ser. No. 792,466
7 Claims. (Cl. 260—37)

This invention relates to the incorporation of certain metal oxides and hydroxides into silicone elastomers as heat stabilizers.

The use of iron oxide as a heat stabilizer in silicone elastomers is now well known in the art. Furthermore, as shown in my copending application Serial Number 776,701, filed November 28, 1958, rare earth metal oxides and hydroxides as a class have been found to be excellent heat stability additives especially for producing non-pigmented silicone elastomers. It has now been found that certain isolated metallic oxides and hydroxides are also excellent heat stability additives.

This invention relates to a composition comprising an essentially diorganopolysiloxane and at least 0.001 part by weight per 100 parts by weight of diorganopolysiloxane of a compound selected from the group consisting of manganese dioxide, nickelous hydroxide, nickelic oxide, chromic oxide, niobic oxide, cuprous oxide, cupric oxide, yttrium oxide, yttrium hydroxide and zirconium hydroxide.

The "essentially diorganopolysiloxane" is a polysiloxane containing primarily diorganosiloxane units, but which can contain some triorganosiloxane, some monoorganosiloxane and some $SiO_2$ units. These materials are well known in the art. The ratio of organic radicals to silicon atoms is preferably within the range of from 1.98:1 to 2.01:1. Generally, the preferred polymers are diorganopolysiloxanes endblocked with hydroxyl radicals, alkoxy radicals, vinyl radicals, acyl radicals or hydrogen atoms. These groups can also be along the polymer chain.

Preferably at least 50% of the organic radicals in the "essentially diorganopolysiloxane" are methyl radicals, but this is not required. The remaining organic radicals can be any monovalent hydrocarbon radical or halogenated monovalent hydrocarbon radical. More specifically, the remaining organic radicals can be, for example, alkyl radicals such as the methyl, ethyl, isopropyl, tert-butyl, 2-ethylhexyl, dodecyl and octadecyl radicals; alkenyl radicals such as the vinyl, allyl and hexadienyl radicals; cycloalkyl radicals such as the cyclopentyl and cyclohexyl radicals; cycloalkenyl radicals such as the cyclopentenyl and cyclohexenyl radicals; aryl radicals such as the phenyl, naphthyl and xenyl radicals; aralkyl radicals such as the benzyl, phenylethyl and xylyl radicals and alkaryl radicals such as the tolyl and dimethylphenyl radicals. These monovalent hydrocarbon radicals can be halogenated to give such radicals as the chloromethyl, 3,3,3-trifluoropropyl, perchlorophenyl, 2,3-dibromocyclohexyl, $\alpha,\alpha,\alpha$-trifluorotolyl, 2,4-dibromobenzyl, trifluoromonochlorovinyl, $\alpha,\beta,\beta$-trifluoro-$\alpha$-chlorocyclobutyl and 2-iodocyclopenten-3-yl radicals, all of which are operative.

The siloxane polymers range from fluids having at least 100 siloxane units per molecule to non-flowing gums. In order to facilitate mixing the siloxanes they should be either readily deformable or soluble in an organic solvent such as benzene. Methods for preparing the siloxane polymers are well know in the art and adequately described in the patent literature.

Any curing system for the siloxane can be employed. For heat curing systems the common commercial vulcanizing agents are organic peroxides containing at least one aromatic acyl radical in the molecule and used in a ratio of from 0.1 to 10 parts of peroxide per 100 parts of siloxane. The best examples of these are tertiary butylperbenzoate, di-tertiarybutylperoxide and benzoyl peroxide.

For room temperature-vulcanizing systems a variety of catalysts are possible. One such system disclosed by Keith E. Polmanteer in his copending application Serial Number 632,630, filed January 7, 1957, consists of mixing with an acid-free diorganopolysiloxane a hydrocarbonoxy silicate in the presence of a metallic carboxylic acid salt catalyst. A variation of this system is disclosed by Alan D. Chipman in his copending application Serial Number 691,176, filed October 21, 1957, employing a cellosolve silicate with the metallic carboxylic acid salt. Another system disclosed by Robert R. Selfridge in his copending application Serial Number 554,636, filed December 22, 1955, consists of mixing with a hydroxylated diorganopolysiloxane a small amount of organohydrogensiloxane. A third system disclosed by Leonard B. Bruner in his copending application Serial Number 723,110, filed March 24, 1958, consists of merely exposing certain acyloxy-endblocked diorganopolysiloxanes to moisture.

In addition, the siloxane compositions can be cured by exposing them to high energy electrons or to electromagnetic radiation such as X-rays, gamma-rays or ultraviolet light.

The organopolysiloxanes employed in this invention can be unfilled or filled as desired. The fillers employed can be any of the inorganic heat stable fillers normally employed with siloxane elastomers with the exception of the metal oxides and hydroxides employed as heat stability additives in this invention. Such fillers include metallic oxides such as titania, ferric oxide, zinc oxide and the like, fibrous fillers such as asbestos and glass, and siliceous fillers such as diatomaceous earth and crushed quartz. However, the benefits of the additives of this invention are best realized with siloxane stocks incorporating any of the well-known reinforcing silica fillers, e.g. fume silicas, silica aerogels and precipitated silicas, having a surface area greater than 50 square meters per gram. These fillers, if desired, can have organosilyl groups attached to the surface thereof. From 20 to 200 parts, but generally from 20 to 80 parts, of the reinforcing silica fillers are employed per 100 parts of siloxane while up to 400 parts of other fillers can be employed. The amount of filler has no effect on the stabilizing action of the additives of this invention.

The additives employed in this invention are well-known oxides and hydroxides. At least 0.001 part by weight of these additives singly or in combination must be added per 100 parts by weight of siloxane in order to detectably improve the heat stability of the siloxane. The effect of these additives increases generally with the amount of additive until 3 to 5 parts have been added per 100 parts of siloxane. Subsequent addition of these heat stability additives produces less and less improvement in the ultimate stock up to approximately 8 parts of additive per 100 parts of siloxane after which further additive addition produces negligible improvement in the heat stability of the siloxane.

The products of this invention are useful in any application where non-stabilized elastomers are utilized. They are particularly useful for gaskets, caulking, tubing or the like to be used where heat conditions are severe.

The following examples are merely illustrative and are not intended to limit this invention which is properly delineated in the claims.

EXAMPLE 1

Three parts by weight of the following compounds were each mixed with an equal weight of a 50,000 cps. dimethylpolysiloxane. Six parts by weight of each of these pastes were added with three parts by weight of a mixture of 1.5 parts by weight benzoyl peroxide and 1.5 parts by weight of a 1000 cps. dimethylpolysiloxane to a rubber stock consisting of 100 parts by weight of a dimethylpolysiloxane gum having a Williams plasticity of .060 inch, 35 parts by weight of a silica filler having a surface area of from 200 to 300 square meters per gram and 7.13 parts by weight of a 40 cps. hydroxylated dimethylpolysiloxane (3.45% by weight silicon-bonded OH groups). The percent elongation of each of these blends was compared with a control after standard heat vulcanization and heat aging for seven days at 250° C. and sixteen hours at 300° C. These results shown in Table I were rechecked after four weeks.

*Table I*

| Additive | Elongation (percent) | | Elongation, percent; after 4 week recheck | |
|---|---|---|---|---|
| | 7 days at 250° C. | 16 hrs. at 300° C. | 7 days at 250° C. | 16 hrs. at 300° C. |
| Control | 23 | 0 | 63 | 10 |
| $Cu_2O$ | 80 | 185 | 100 | 233 |
| CuO | 175 | 223 | 175 | 190 |
| $Cr_2O_3$ | 175 | 230 | 250 | 250 |
| $MnO_2$ | 183 | 250 | 220 | 365 |
| $Ni_2O_3$ | 240 | 270 | 245 | 80 |
| Equal parts of CuO and $Ni_2O_3$ | 217 | 280 | 230 | 122 |

EXAMPLE 2

The stock employed in this example consisted in each case of 100 parts by weight of a dimethylpolysiloxane gum having a Williams plasticity of .060 inch, 35 parts by weight of a silica filler having a surface area of from 200 to 300 square meters per gram, 20 parts by weight of a diatomaceous earth known to provide some degree of heat stability to rubber stocks, 7.3 parts by weight of a 40 cps. hydroxylated dimethylpolysiloxane (3.45% by weight OH) and 1 part by weight of bis-dichlorobenzoyl peroxide added as a 40% by weight mixture in a 1000 cps. dimethylpolysiloxane. Each of the following compounds was added to a sample of this stock in a ratio of three parts by weight of additive per 100 parts of siloxane gum. The effect of the additives on heat stability of the subsequently vulcanized stocks was determined by measuring percent elongation of each stock after 16 hours' aging at 300° C. The results were rechecked after four weeks.

*Table II*

| Additive | Elongation (percent) after 16 hours at 300° C. | |
|---|---|---|
| | Original | Recheck |
| Control | 60 | 70 |
| $Ni_2O_3$ | 200 | 235 |
| $Cr_2O_3$ | 203 | 157 |
| $Nb_2O_5$ | 240 | 243 |

EXAMPLE 3

A stock consisting of 100 parts by weight of a dimethylpolysiloxane gum having a Williams plasticity of .060 inch, 35 parts by weight of a silica filler having a surface area of from 200 to 300 square meters per gram, 7.3 parts by weight of a 40 cps. hydroxylated dimethylpolysiloxane (3.45% by weight silicon-bonded OH), 1 part by weight of bis-dichlorobenzoyl peroxide added as a 40% by weight mixture in a 1000 cps. dimethylpolysiloxane and 3 parts by weight of zirconium hydroxide was tested after heat vulcanization and heat aging 16 hours at 300° C. and found to have a tensile strength of 733 pounds per square inch and 347 percent elongation at break. A similar composition containing a non-stabilizing metal salt additive in place of the zirconium hydroxide was brittle after 16 hours at 300° C. having essentially no tensile strength and 0% elongation at break.

Similar heat stable siloxane rubber stocks are produced when 5 parts by weight of zirconium hydroxide are employed in lieu of 3 parts as illustrated above.

EXAMPLE 4

0.63 part by weight of nickelous hydroxide was mixed with a rubber stock of 100 parts by weight of a vinyldimethylsiloxy-endblocked copolymer of 0.142 mol percent vinylmethylsiloxane units and 99.858 mol percent dimethylsiloxane units, said copolymer having a Williams plasticity of approximately 0.040 inch, 35 parts by weight of a reinforcing fume silica filler, 1 part by weight of tris-trimethylsilylborate as a retarder for crepe aging and 1 part by weight of bis-dichlorobenzoyl peroxide as a 40% by weight mixture in a 1000 cs. dimethylpolysiloxane. After standard heat vulcanization this sample and a control were heat aged for 24 hours at 600° F. (316° C.) and the percent elongation was measured for each stock. The control stock was brittle having 0% elongation at break while the stock stabilized with nickelous hydroxide had 100% elongation at break.

EXAMPLE 5

The stock employed in this example consisted of 100 parts by weight of a vinyldimethylsiloxy-endblocked copolymer of 0.142 mol percent vinylmethylsiloxane units and 99.858 mol percent dimethylsiloxane units, said copolymer having a Williams plasticity of approximately 0.040 inch, 35 parts by weight of a reinforcing fume silica filler, 9 parts by weight of a 40 cps. hydroxylated dimethylpolysiloxane (3.45% by weight silicon-bonded OH) and 1 part by weight of bis-dichlorobenzoyl peroxide added as a 40% by weight mixture in a 1000 cs. dimethylpolysiloxane. To samples of this stock yttrium hydroxide was added in the amounts shown as a solvent dispersion containing 7.8 percent by weight of a reinforcing fume silica and 0.97 percent by weight yttrium. Each sample was heat vulcanized and heat aged for 72 hours at 250° C. The percent elongation at break was then determined.

*Table III*

| Parts of $Y(OH)_3$ per 100 parts gum: | Elongation (percent) |
|---|---|
| Control | 15 |
| .08 | 360 |
| .16 | 430 |
| .32 | 430 |

Similar results are obtained when yttrium oxide is substituted for yttrium hydroxide.

EXAMPLE 6

Similar thermally stable rubbers are obtained when three parts by weight of $MnO_2$ are mixed with 100 parts by weight of the 100,000 cs. hydroxy-endblocked polysiloxanes shown below compounded with three parts by weight of the silicates shown below and two parts by weight dibutyl tin diacetate and the compounds are allowed to cure at room temperature or are heat cured.

| Siloxane | Silicate |
|---|---|
| EtMeSiO | Ethylpolysilicate. |
| 92.5 mol percent Me₂SiO <br> 7.5 mol percent ViMeSiO | n-Butylorthosilicate. |
| Me <br> CF₃CH₂CH₂SiO <br> 90 mol percent Me₂SiO | Isopropylpolysilicate. |
| 10 mol percent F₃CMe>SiO | CF₃CH₂CH₂Si(OCH₂CH₂OCH₃)₃. |
| 95 mol percent Me₂SiO <br> 5 mol percent Ph₂SiO | Si(OCH₂CH₂OC₂H₅)₄. |

That which is claimed is:
1. A composition of matter comprising an essentially diorganopolysiloxane in which the organic radicals are selected from the group consisting of monovalent hydrocarbon radicals and monovalent halohydrocarbon radicals attached to the silicon atom by a silicon carbon linkage there being an average of from 1.98 to 2.01 of said organic radicals per silicon atom, a reinforcing silica filler and from .001 to 8 parts by weight per 100 parts by weight of the diorganopolysiloxane of a compound selected from the group consisting of manganese dioxide, nickelous hydroxide, nickelic oxide, chromic oxide, niobic oxide, yttrium oxide, yttrium hydroxide and zirconium hydroxide.

2. A composition of matter comprising an essentially diorganopolysiloxane in which the organic radicals are selected from the group consisting of monovalent hydrocarbon radicals and monovalent halohydrocarbon radicals attached to the silicon atom by a silicon carbon linkage there being an average of from 1.98 to 2.01 of said organic radicals per silicon atom, a reinforcing silica filler, a vulcanizing agent and from .001 to 8 parts by weight per 100 parts by weight of the diorganopolysiloxane of a compound selected from the group consisting of manganese dioxide, nickelous hydroxide, nickelic oxide, chromic oxide, niobic oxide, yttrium oxide, yttrium hydroxide and zirconium hydroxide.

3. The composition of claim 1 wherein at least 50% of the organic radicals in the diorganopolysiloxane are methyl radicals and the remainder of the organic radicals are selected from the group consisting of monovalent hydrocarbon radicals and halogenated hydrocarbon radicals.

4. The composition of claim 2 wherein at least 50% of the organic radicals in the diorganopolysiloxane are methyl radicals and the remainder of the organic radicals are selected from the group consisting of monovalent hydrocarbon radicals and halogenated hydrocarbon radicals.

5. A vulcanized elastomer comprising an essentially diorganopolysiloxane in which the organic radicals are selected from the group consisting of monovalent hydrocarbon radicals and monovalent halohydrocarbon radicals attached to the silicon atom by a silicon carbon linkage there being an average of from 1.98 to 2.01 of organic radicals per silicon atom, a reinforcing silica filler and from 0.001 to 8 parts by weight per 100 parts by weight of the diorganopolysiloxane of a compound selected from the group consisting of manganese dioxide, nickelous hydroxide, nickelic oxide, chromic oxide, niobic oxide, yttrium oxide, yttrium hydroxide and zirconium hydroxide.

6. The elastomer of claim 5 wherein at least 50% of the organic radicals in the diorganopolysiloxane are methyl radicals and the remainder of the organic radicals are selected from the group consisting of monovalent hydrocarbon radicals and halogenated hydrocarbon radicals.

7. A composition of matter comprising a diorganopolysiloxane gum in which the organic radicals are predominately methyl groups, any remaining organic radicals being vinyl groups, a reinforcing silica filler and as a heat stabilizer manganese dioxide in stabilizing amounts.

References Cited in the file of this patent
UNITED STATES PATENTS

| 2,467,853 | Poskitt et al. | Apr. 19, 1949 |
| 2,480,620 | Warrick | Aug. 30, 1949 |
| 2,658,882 | Maneri | Nov. 10, 1953 |
| 2,842,516 | Nitzsche et al. | July 8, 1958 |
| 2,875,098 | Blatz | Feb. 24, 1959 |
| 2,891,033 | Savage | June 16, 1959 |

FOREIGN PATENTS

| 554,767 | Belgium | Feb. 28, 1957 |